US012639560B2

(12) United States Patent
Park et al.

(10) Patent No.: US 12,639,560 B2
(45) Date of Patent: May 26, 2026

(54) WEIGHT TRANSFER APPARATUS FOR NEUROMORPHIC DEVICES AND WEIGHT TRANSFER METHOD USING THE SAME

(71) Applicant: SEOUL NATIONAL UNIVERSITY R&DB FOUNDATION, Seoul (KR)

(72) Inventors: Byung-Gook Park, Seoul (KR); Tae-Hyeon Kim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 791 days.

(21) Appl. No.: 17/972,049

(22) Filed: Oct. 24, 2022

(65) Prior Publication Data

US 2023/0162014 A1 May 25, 2023

Related U.S. Application Data

(63) Continuation of application No. PCT/KR2022/012743, filed on Aug. 25, 2022.

(30) Foreign Application Priority Data

| | | |
|---|---|---|
| Nov. 19, 2021 | (KR) | 10-2021-0159893 |
| Jun. 14, 2022 | (KR) | 10-2022-0071878 |

(51) Int. Cl.
*G06N 3/063* (2023.01)
*G06F 16/23* (2019.01)
(Continued)

(52) U.S. Cl.
CPC ......... *G06N 3/063* (2013.01); *G06F 16/2379* (2019.01); *G06F 16/2455* (2019.01);
(Continued)

(58) Field of Classification Search
CPC ........ G06N 3/065; G06N 3/08; G06N 3/0635; G06N 3/049; G06N 16/063; G06F 16/2379; G06F 16/2455
(Continued)

(56) References Cited

U.S. PATENT DOCUMENTS

| | | | |
|---|---|---|---|
| 10,504,021 B2 | 12/2019 | Akopyan et al. | |
| 2012/0109864 A1* | 5/2012 | Modha ..................... | G06N 3/08 706/25 |

(Continued)

FOREIGN PATENT DOCUMENTS

| | | | | |
|---|---|---|---|---|
| GB | 2581310 A | * | 12/2020 | .............. G06N 3/08 |
| JP | 2019519045 | | 7/2019 | |

(Continued)

*Primary Examiner* — Shahid A Alam
(74) *Attorney, Agent, or Firm* — CANTOR COLBURN LLP

(57) ABSTRACT

A weight transfer apparatus for a neuromorphic device includes a memory storing a weight transfer program for the neuromorphic device, and a processor configured to execute the weight transfer program. The weight transfer program builds an artificial neural network learning model, transfers a weight of the built artificial neural network learning model to the neuromorphic device, determines whether a synaptic cell included in the neuromorphic device to which the weight is transferred is defective, rebuilds the artificial neural network learning model after the artificial neural network learning model sets a weight corresponding to a defective synaptic cell to 0, and transfers a weight of the rebuilt artificial neural network learning model to the neuromorphic device.

11 Claims, 8 Drawing Sheets

(51) Int. Cl.

| | | |
|---|---|---|
| *G06F 16/2455* | (2019.01) |
| *G06N 3/065* | (2023.01) |
| *G06N 3/08* | (2023.01) |
| *G06N 3/049* | (2023.01) |

(52) U.S. Cl.
CPC .............. *G06N 3/065* (2023.01); *G06N 3/08*
(2013.01); *G06N 3/049* (2013.01)

(58) Field of Classification Search
USPC .......................................................... 706/25
See application file for complete search history.

(56) References Cited

U.S. PATENT DOCUMENTS

| | | | | |
|---|---|---|---|---|
| 2015/0106316 | A1* | 4/2015 | Birdwell ................ | G06N 3/086 |
| | | | | 706/33 |
| 2016/0012330 | A1* | 1/2016 | Pescianschi ............ | G06N 3/08 |
| | | | | 706/25 |

| | | | | |
|---|---|---|---|---|
| 2016/0224886 | A1* | 8/2016 | Akopyan ................. | G06N 3/06 |
| 2019/0228287 | A1* | 7/2019 | Okazaki .................. | G06N 3/08 |
| 2020/0012925 | A1* | 1/2020 | Kim ........................ | G06N 3/049 |
| 2020/0342298 | A1* | 10/2020 | Shibata ................. | G06N 3/065 |
| 2021/0034331 | A1* | 2/2021 | Shibata ................... | G06N 3/04 |
| 2021/0125048 | A1* | 4/2021 | Jang ...................... | G06N 3/065 |
| 2021/0319293 | A1* | 10/2021 | Lee ........................ | G06N 3/049 |

FOREIGN PATENT DOCUMENTS

| | | |
|---|---|---|
| JP | 6708146 B2 | 6/2020 |
| JP | 6747610 | 8/2020 |
| JP | 6773239 | 10/2020 |
| JP | 2021511566 | 5/2021 |
| KR | 20190051766 | 5/2019 |
| KR | 20200021353 | 2/2020 |
| KR | 102163498 B | 10/2020 |
| KR | 20200113106 | 10/2020 |
| KR | 20210024640 | 3/2021 |
| KR | 20210093648 A | 7/2021 |
| KR | 20210100194 | 8/2021 |

* cited by examiner

100

1

WEIGHT TRANSFER APPARATUS FOR NEUROMORPHIC DEVICES AND WEIGHT TRANSFER METHOD USING THE SAME

BACKGROUND

1. Technical Field

The present disclosure relates to a weight transfer apparatus for a neuromorphic device and a weight transfer method using the weight transfer apparatus.

2. Related Art

Recently, along with development of a computing technology based on an artificial neural network, research and development on a hardware-based neural network have also been actively performed.

A neural network and a spiking neural network (SNN), which are currently widely studied, have started from imitation (concepts for memory, learning, and inference) of a real biological nervous system, adopt only a similar network structure, and are different from an actual biological nervous system in various aspects, such as signal transmission, an information expression method, and a learning method.

Meanwhile, a hardware-based SNN operating almost identically to a real nervous system is rarely used in the real industry because no learning method has yet been developed that may outperform the existing neural network. However, if a synaptic weight is derived by using the existing neural network and inferred by using an SNN method based thereon, a high-accuracy and ultra-low-power computing system may be implemented, and research on this is being actively conducted.

When synaptic weights learned through a neural network are transferred to a hardware-based neural network and inferred, almost the same level of performance as the existing neural network may be achieved. However, the known synaptic element has a possibility that a defect may occur during a manufacturing process thereof, and thus, a method for solving this problem is being studied. When a serious defect occurs in the synaptic element, there is the known technology using a method of accessing a redundant array. In addition, a technology is being developed to maximize stability of the synaptic element through diversification of materials but is not a fundamental solution to remove a defective element.

The present disclosure prevents performance from decreasing during an inference process by utilizing a synaptic element included in a neuromorphic device even when the synaptic element includes a defective cell.

An example of related art includes Korean Patent Publication No. 10-2019-0051766 (Title of the invention: Neuron Circuit, system and method for synapse weight learning).

SUMMARY

The present disclosure provides a weight transfer apparatus and a weight transfer method that build a new artificial neural network learning model by considering a defective cell in a synaptic element and transfer weights of the newly built learning model.

However, a technical object to be solved by the present embodiment is not limited to the technical object described above, and there may be other technical objects.

According to a first aspect of the present disclosure, a weight transfer apparatus for a neuromorphic device includes a memory storing a weight transfer program for the neuromorphic device, and a processor configured to execute the weight transfer program, wherein the weight transfer program builds an artificial neural network learning model, transfers a weight of the built artificial neural network learning model to the neuromorphic device, determines whether a synaptic cell included in the neuromorphic device to which the weight is transferred is defective, rebuilds the artificial neural network learning model after the artificial neural network learning model sets a weight corresponding to a defective synaptic cell to 0, and transfers a weight of the rebuilt artificial neural network learning model to the neuromorphic device.

According to a second aspect of the present disclosure, a weight transfer apparatus for a neuromorphic device includes a memory storing a weight transfer program for the neuromorphic device, and a processor configured to execute the weight transfer program, wherein the weight transfer program determines whether a synaptic cell included in the neuromorphic device is defective, builds an artificial neural network learning model to be transferred to the neuromorphic device in a state where a weight corresponding to a defective synaptic cell is set to 0, and transfers a weight of the built artificial neural network learning model to the neuromorphic device.

According to a third aspect of the present disclosure, a weight transfer method for a neuromorphic device includes building an artificial neural network learning model, transferring a weight of the built learning model to the neuromorphic device, determining whether a synaptic cell included in the neuromorphic device is defective based on the transferred weight, rebuilding the learning model by setting a weight of the artificial neural network learning model corresponding to a synaptic cell determined to be defective to 0 and, and transferring a weight of the rebuilt artificial neural network learning model to the neuromorphic device.

According to a fourth aspect of the present disclosure, a weight transfer method for a neuromorphic device includes determining whether a synaptic cell included in the neuromorphic device is defective, building an artificial neural network learning model by setting a weight of the artificial neural network learning model corresponding to a synaptic cell determined to be defective to 0, and transferring a weight of the built artificial neural network learning model to the neuromorphic device.

BRIEF DESCRIPTION OF THE DRAWINGS

Various embodiments of the present disclosure will become more apparent in view of the attached drawings and accompanying detailed description, in which.

DETAILED DESCRIPTION OF THE EMBODIMENTS

Figure 1:
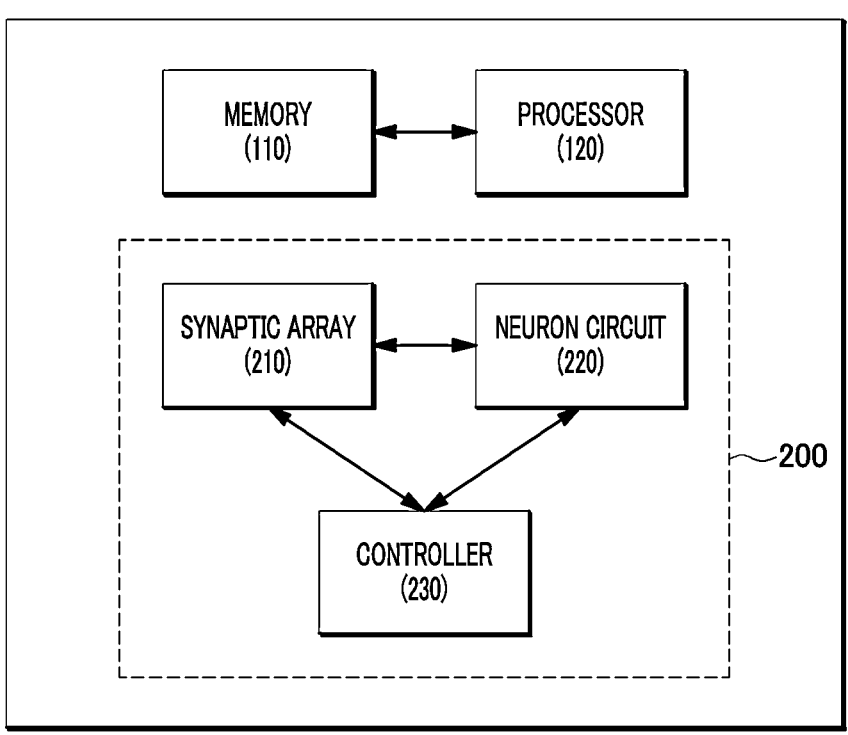
FIG. 1 is a block diagram illustrating a configuration of a weight transfer apparatus for a neuromorphic device, according to an embodiment of the present disclosure.

Hereinafter, embodiments of the present disclosure will be described in detail with reference to the accompanying drawings such that those skilled in the art may easily implement the embodiments. However, the present disclosure may be embodied in several different forms and is not limited to the embodiments described herein. In order to clearly describe the present disclosure in the drawings, parts irrelevant to the description are omitted, and similar reference numerals are attached to similar components throughout the specification.

Throughout the specification, when a portion is "connected" to another portion, this includes not only a case of being "directly connected" but also a case of being "electrically connected" with another component therebetween.

Throughout the specification, when a member is said to be located "on" another member, this includes not only a case in which a member is in contact with another member but also a case in which another member is present between the two members.

A neuromorphic device of the present disclosure is manufactured to imitate a human brain in hardware by using a semiconductor process, and includes a synaptic element corresponding to a synapse of the brain, a neuron circuit corresponding to a neuron, and various peripheral circuits.

Hereinafter, embodiments of the present disclosure will be described in detail with reference to the accompanying drawings.

FIG. 1 is a block diagram illustrating a configuration of a weight transfer apparatus for a neuromorphic device, according to an embodiment of the present disclosure.

As illustrated, a weight transfer apparatus 100 is implemented in the form of a computing device including a memory 110 and a processor 120 and may include a communication module, a peripheral device for various types of JO processing, a power supply unit, and so on. In addition, the weight transfer apparatus 100 may further include a socket on which a neuromorphic device 200 that is a target of weight transfer is mounted, various sensing circuits for reading a state of the neuromorphic device 200, and various voltage supply circuits for writing weights to the neuromorphic device 200. These correspond to a peripheral circuit for writing data to or reading data from a memory cell of a general semiconductor memory device, and thus, detailed descriptions thereof are omitted.

The memory 110 stores a weight transfer program for the neuromorphic device, and an operation of building an artificial neural network learning model and an operation of transferring weights of the built learning model to the neuromorphic device 200 are performed by the program. The memory 110 collectively refers to a non-volatile storage device that continuously maintains stored information even when power is not supplied, and a volatile storage device that requires power to maintain the stored information. In addition, the memory 110 may perform a function of temporarily or permanently storing data processed by the processor 120.

The processor 120 executes a weight transfer program stored in the memory 110. The processor 120 may include various types of devices for controlling and processing data. The processor 120 may refer to a data processing device which is embedded in hardware and includes a physically structured circuit to perform a function represented as a code or an instruction included in a program. In one example, the processor 120 may be implemented in the form of a microprocessor, a central processing unit (CPU), a processor core, a multiprocessor, an application-specific integrated circuit (ASIC), or a field programmable gate array (FPGA), but the scope of the present disclosure is not limited thereto.

In addition, the neuromorphic device 200, that is a target to which weights are transferred by the weight transfer apparatus 100, may include a synaptic array 210, a neuron circuit 220, and a controller 230.

The synaptic array 210 is implemented to perform the same function as a brain synapse and is generally implemented based on a non-volatile memory device. The synaptic array 210 corresponds to a plurality of synaptic cells, and each synaptic cell stores a predetermined weight. For example, the synaptic array 210 may include synaptic cells corresponding to a multiplication of the number of front-end neuron circuits and the number of rear-end neuron circuits, which are coupled to the synaptic array 210. An operation of storing weights in the synaptic array 210 or a process of reading the stored weights from the synaptic array 210 is performed through the same principle as a program operation or a read operation performed in a general nonvolatile memory device. Here, the weight means a weight that is multiplied by an input signal in a perceptron structure or so on representing an artificial neural network model and is additionally defined as a concept including a bias which is a special weight with an input of 1.

The neuron circuit 220 may be divided into a front-end neuron circuit or pre-neuron circuit coupled to a front end of the synaptic array 210, and a rear-end neuron circuit or a post-neuron circuit coupled to a rear end of the synaptic array 210. The neuron circuit 220 includes a signal integrator for integrating a signal transmitted through a previous synapse or so on, a comparator for comparing whether an integrated signal is greater than or equal to a threshold, and so on. In addition, when a comparison result of the comparator is greater than or equal to the threshold, a general neuron circuit is configured to output a spike signal according to a firing operation. In addition, a counter for calculating the number of spike signals may be connected to each neuron circuit 120. Meanwhile, in relation to a configuration of the signal integrator, an embodiment in which a signal is integrated by using a capacitor is generally known.

The controller 230 controls operations of the synaptic array 210 and the neuron circuit 220. In addition, the controller 230 may include a peripheral circuit that performs an operation of programming a weight or a bias for the synaptic array 210 and an operation of reading the stored weight. In addition, the controller 230 may include various voltage supply modules that perform an operation such as an incremental step pulse program (ISPP) or incremental step pulse erase (ISPE) for the synaptic array 210 in order to adjust a weight or a bias. In addition, the controller 230 may be configured to perform a program operation or an erase operation of weights suitable for device characteristics of the synaptic array 210.

Figure 2:
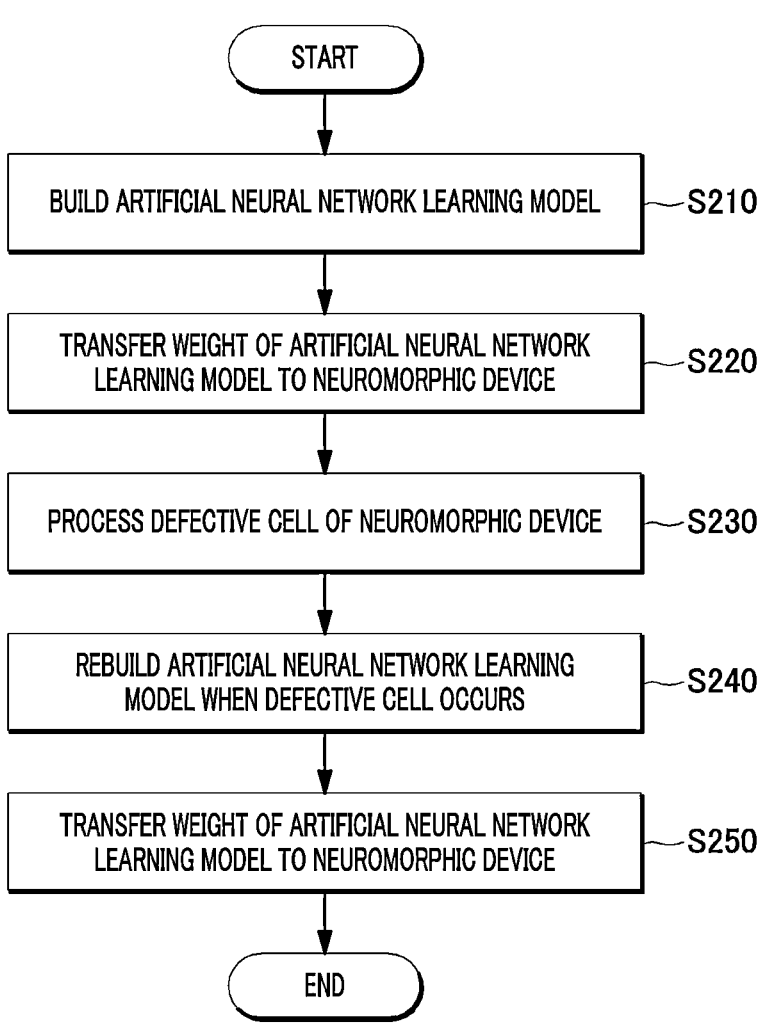
FIG. 2 is a flowchart illustrating a weight transfer method according to an embodiment of the present disclosure.

FIG. 2 is a flowchart illustrating a weight transfer method according to an embodiment of the present disclosure.

A weight transfer program executed by the weight transfer apparatus 100 may first build an artificial neural network learning model (S210). The artificial neural network learning models built by the weight transfer program may be built by using various learning network structures, such as a deep feedforward network (DFN), a recurrent neural network (RNN), a long short-term memory (LSTM), an autoencoder, a convolutional neural network (CNN), a generative adversarial network (GAN), and a deep residual network (DRN). When each artificial neural network learning model is completed, a weight is determined for each node, and the present disclosure performs a process of transferring the determined weight to the neuromorphic device 200 and then performing inference by inputting input data to the neuromorphic device 200. To this end, the weight transfer apparatus 100 builds an artificial neural network learning model to calculate a weight to be transferred to the neuromorphic device 200.

Next, the weight of the artificial neural network learning model is transferred to the neuromorphic device 200 (S220).

The weight of the artificial neural network learning model may be calculated in the form of a matrix, which is recorded in the form of a matrix in the synaptic array 210 included in the neuromorphic device 200, and as such, a process of recording a weight in the neuromorphic device 200 is defined as transfer. Before a transfer operation is performed, a weight is converted into a conductivity value stored in each synaptic cell of the synaptic array 210, and a data write operation is performed for each synaptic array 210 according to the converted conductivity value.

A specific transfer method may change depending on a device type of each synaptic array 210, and for example, the synaptic array 210 based on a flash memory may record a weight in each synaptic cell through a data program operation, such as an incremental step pulse program (ISPP) or incremental step pulse erase (ISPE).

Next, whether a synaptic cell included in a neuromorphic device to which a weight is transferred is defective (S230).

For example, a difference between a conductivity value to be recorded in each synaptic cell and a conductivity value actually output from each synaptic cell is compared with a threshold, and when the compared result value is within the threshold, the synaptic cell is determined to be a normal cell, and when the compared result value exceeds the threshold, the synaptic cell is determined to be a defective cell.

When there is a defective cell in the synaptic array, there is a high possibility that it is difficult to record data in the relevant cell even after that, and thus, a weight of an artificial neural network learning model corresponding to the relevant synaptic cell is set to have a value of 0, and the artificial neural network learning model is rebuilt (S240). In this case, conductivity of the synaptic cell determined to be defective is set to 0. Meanwhile, when there is no defective cell, the transfer process is completed.

Figure 4A:
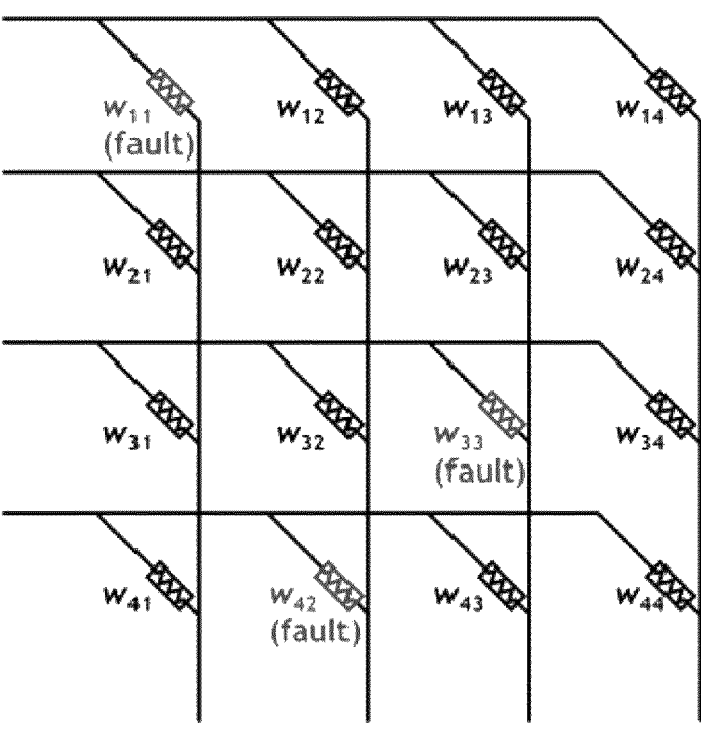
FIGS. 4A and 4B are diagrams illustrating a method of processing a defective cell in a synaptic cell, according to an embodiment of the present disclosure.
Figure 4B:
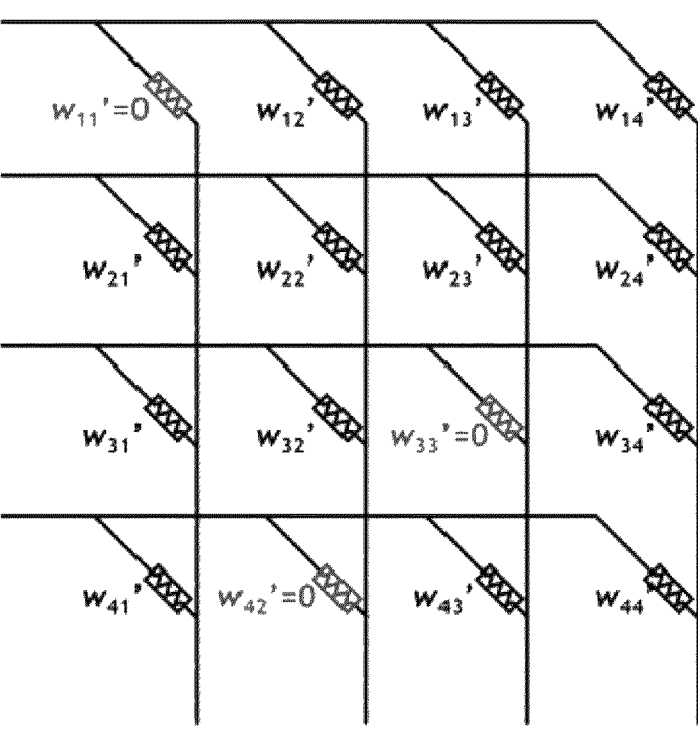

FIGS. 4A and 4B are diagrams illustrating a method of processing a defective cell in a synaptic cell, according to an embodiment of the present disclosure.

Synaptic arrays illustrated in FIGS. 4A and 4B each have a crossbar array structure and each include EEPROM-based synaptic cells for which electronic fuses are used. When a defective element (marked as fault) is sensed as illustrated in FIG. 4A, a fuse of the defective element is blown such that conductivity of the defective element is set to 0 as illustrated in FIG. 4B.

Alternatively, in another embodiment, a synaptic array in which a synaptic element is connected in series to a fuse for each cell may be considered, and a method of blowing a fuse connected in series to a defective synaptic element may be considered.

Figure 5:
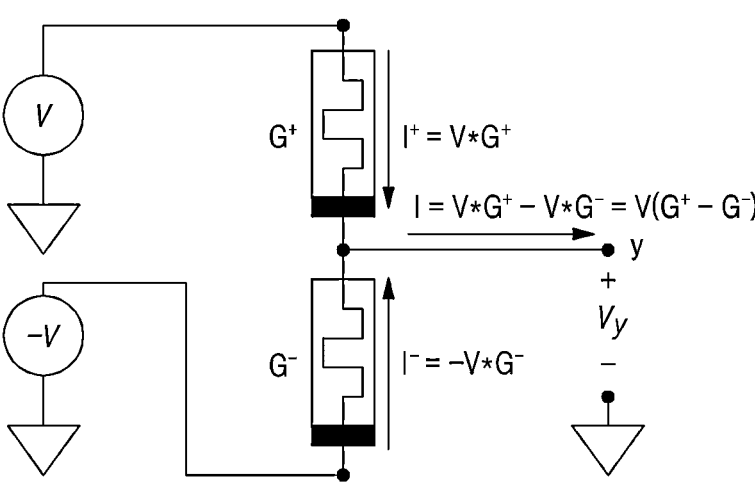
FIG. 5 is a diagram illustrating a method of processing a defective cell in a synaptic cell, according to another embodiment of the present disclosure.

FIG. 5 is a diagram illustrating a method of processing a defective cell in a synaptic cell, according to another embodiment of the present disclosure.

In the synaptic array illustrated in FIG. 5, a weight may be defined by using a difference in conductivity between two synapses. When conductivities of two adjacent synaptic cells are respectively referred to as G+ and G−, a current flowing through each synaptic cell may be defined by multiplying a voltage applied to each synaptic cell by conductivities of each synaptic cell. In order to set the conductivities of each synaptic cell to 0, cells adjacent to each other may be bundled in pairs to express one weight. For example, in this case, making the conductivity zero means that a difference between conductivities (G+-G−) of cells adjacent to each other is zero in the strict sense.

For example, when G+ and G− are values between 0 and 1 and the conductivity G+ of a defective synaptic cell is fixed, the conductivity G− of the paired synaptic cell is programmed to have the same value, and thus, the final weight becomes zero. That is, when the conductivity of the defective cell is measured as 1, an operation of adjusting a state of the corresponding synaptic cell is performed such that the conductivity of the paired synaptic cell is also 1. Through this, a difference in conductivity between two cells becomes zero.

Referring back to FIG. 2, a weight of the updated artificial neural network learning model is transferred to the neuromorphic device through the rebuilding process (S250). As described above, when the weight of the artificial neural network learning model corresponding to the defective cell is set to 0, other weights may be changed in the process of rebuilding the artificial neural network learning model, and thus, a weight of the artificial neural network learning model changed in this way is transferred to the neuromorphic device. By performing this process, an artificial neural network learning model may be newly built by using characteristics of a synaptic array including a defective element, and accuracy of inference may be improved.

Meanwhile, the above steps (S230 to S250) may be repeatedly performed until all of the processing on the defective cells is completed.

Figure 3:
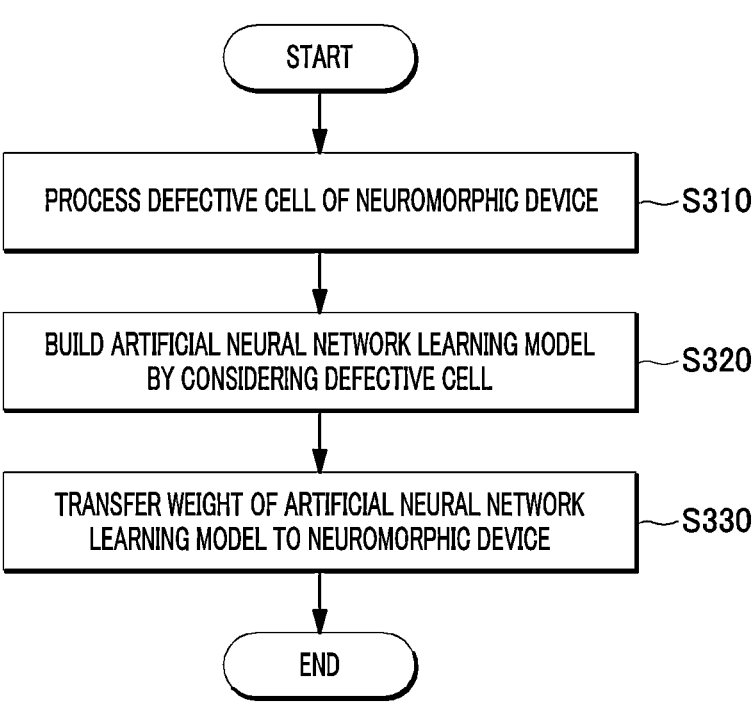
FIG. 3 is a flowchart illustrating a weight transfer method according to another embodiment of the present disclosure.

FIG. 3 is a flowchart illustrating a weight transfer method according to another embodiment of the present disclosure.

A schematic configuration thereof is similar to the method of FIG. 2, but there is a difference in that a defective cell of the neuromorphic device is identified and processing of the defective cell is preferentially performed.

That is, defect processing on the synaptic cell included in the neuromorphic device is first performed (S310). In order to first determine whether a synaptic cell is defective, the same input data is collectively recorded in each synaptic cell. Then, a difference between a conductivity value to be recorded in each synaptic cell and a conductivity value actually output from each synaptic cell is compared with a threshold, and when the compared result value is within the threshold, the synaptic cell is determined to be a normal cell, and when the compared result value exceeds the threshold, the synaptic cell is determined to be a defective cell. In addition, conductivity of the synaptic cell determined to be defective is set to 0.

Meanwhile, when a defective cell does not occur, a learning model building process and a transfer process are sequentially performed thereafter.

Next, an artificial neural network learning model is built by considering a defective cell (S320).

For example, a difference between a conductivity value to be recorded in each synaptic cell and a conductivity value actually output from each synaptic cell is compared with a threshold, and when the compared result value is within the threshold, the synaptic cell is determined to be a normal cell, and when the compared result value exceeds the threshold, the synaptic cell is determined to be a defective cell.

When a defective cell occurs, there is a high possibility that it is difficult to record data in the relevant cell even after that, and thus, an artificial neural network learning model is built in a state where a weight of the artificial neural network learning model corresponding to the relevant synaptic cell is set to have a value of 0.

Next, weights of the artificial neural network learning model generated through the building process of the artificial neural network learning model are transferred to the neuromorphic device (S330). As described above, the artificial neural network learning model is built in a state where the weight of the artificial neural network learning model corresponding to a defective cell is set to 0, and thus, an artificial neural network learning model reflecting a state of a synaptic cell may be built. By performing this process, an artificial neural network learning model may be newly built by using characteristics of a synaptic array including a defective element, and accuracy of inference may be improved.

As described above, the present disclosure has technical characteristics in that weights of an artificial neural network learning model may be generated or newly updated by reflecting a state of a defective cell. In addition, the artificial neural network learning model built through this process may reflect hardware defect characteristics of each synaptic element, and through this, accuracy of inference of each neuromorphic device may be improved.

FIGS. 6A to 6D illustrate graphs on an effect of a weight transfer technique according to an embodiment of the present disclosure.

The respective graphs of FIGS. 6A to 6D illustrate inference results using transfer of a learning model for classifying an MNIST data set onto each neuromorphic device.

Figure 6A:
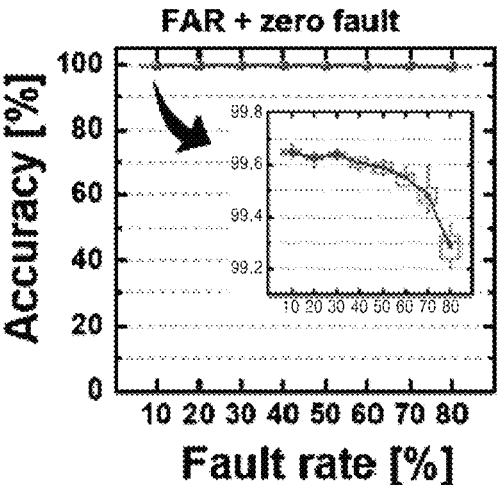
FIGS. 6A to 6D illustrate graphs on an effect of a weight transfer technique according to an embodiment of the present disclosure.
Figure 6B:
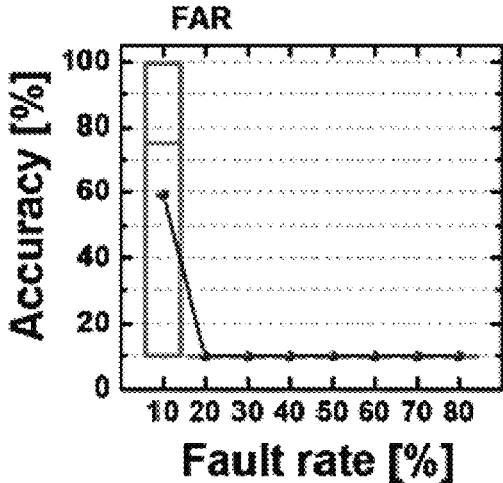
Figure 6C:
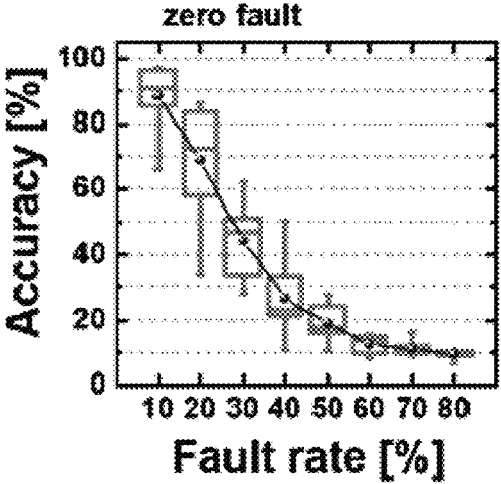
Figure 6D:
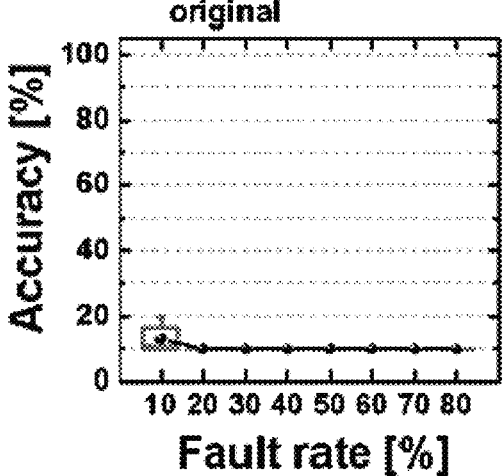

FIG. 6D illustrates that, even when only 10% of defective elements having a certain weight value occur, accuracy is reduced to about 10%.

FIG. 6B illustrates a result of a technique known as fault-aware retraining (FAR), in which, when a defective element occurs in a synaptic element array, conductivity of a defective element is reflected, and only weights of normal synaptic elements are updated through re-learning. Although accuracy is improved when defect recognition re-learning is applied, it is still insufficient in that accuracy of an average of 60% is achieved even at a defect rate of 10%, and there is a large deviation.

FIG. 6C illustrates that an operation of changing a weight of a defective element to 0 is performed, and with this alone, it can be seen that a recognition rate is improved more than the defect recognition re-learning of FIG. 6B.

In addition, as illustrated in FIG. 6A, it can be seen that the defect recognition re-learning and an operation of the present disclosure that changes a weight of a defective element to 0 may significantly improve performance with a recognition rate of 99.29% even at a defect rate of 80%.

According to the present disclosure described above, it is possible to build an artificial neural network learning model by considering a hardware defect state of a synaptic element. Through this, inference performance of a neuromorphic device using the synaptic element may be greatly improved.

As such, the present disclosure has a technical difference in that a defective cell is identified among synaptic cells included in a neuromorphic device and an artificial neural network learning model is rebuilt by reflecting the defective cell.

An embodiment of the present disclosure may also be implemented in the form of a recording medium including instructions executable by a computer, such as a program module executed by the computer. Computer-readable media may be any available media that may be accessed by a computer and include both volatile and nonvolatile media and removable and non-removable media. In addition, the computer-readable media may include all computer storage media. The computer storage media includes both volatile and nonvolatile media and removable and non-removable media implemented by any method or technology of storing information, such as a computer readable instruction, a data structure, a program module, and other data.

Although the method and system according to the present disclosure are described with reference to specific embodiments, some or all of their components or operations may be implemented by using a computer system having a general-purpose hardware architecture.

The above descriptions on the present disclosure are for illustration, and those skilled in the art to which the present disclosure pertains may understand that the descriptions may be easily modified into other specific forms without changing the technical idea or essential features of the present disclosure. Therefore, it should be understood that the embodiments described above are illustrative in all respects and not restrictive. For example, each component described as a single type may be implemented in a dispersed form, and likewise components described as distributed may be implemented in a combined form.

The scope of the present disclosure is indicated by the following claims rather than the above detailed description, and all changes or modifications derived from the meaning and scope of the claims and their equivalents should be interpreted as being included in the scope of the present disclosure.

What is claimed is:

1. A weight transfer apparatus for a neuromorphic device, comprising:

a memory storing a weight transfer program for the neuromorphic device; and a processor configured to execute the weight transfer program, wherein the weight transfer program:

builds an artificial neural network learning model, transfers a weight of the built artificial neural network learning model to the neuromorphic device, determines, for each synaptic cell among synaptic cells included in the neuromorphic device to which the weight is transferred, a difference value between a conductivity value to be recorded in the synaptic cell and a conductivity value output from the synaptic cell, determines a synaptic cell among the synaptic cells included in the neuromorphic device to which the weight is transferred is defective, based on comparing the difference value associated with the synaptic cell to a threshold value, rebuilds the artificial neural network learning model after the artificial neural network learning model sets a weight corresponding to a the defective synaptic cell to 0, and transfers a weight of the rebuilt artificial neural network learning model to the neuromorphic device.

2. The weight transfer apparatus of claim 1, wherein conductivity of the synaptic cell determined to be defective in the neuromorphic device is set to 0.

3. The weight transfer apparatus of claim 1, wherein the weight transfer program:

determines a second synaptic cell among the synaptic cells included in the neuromorphic device to which the weight is transferred is not defective, based on comparing the difference value associated with the second synaptic cell to the threshold value; and rebuilds the artificial neural network learning model without modifying a weight corresponding to the second synaptic cell.

4. A weight transfer apparatus for a neuromorphic device, comprising:

a memory storing a weight transfer program for the neuromorphic device; and a processor configured to execute the weight transfer program, wherein the weight transfer program:

determines, for each synaptic cell among synaptic cells included in the neuromorphic device, a difference value between a conductivity value to be recorded in the synaptic cell and a conductivity value output from the synaptic cell, determines a synaptic cell included among the synaptic cells in the neuromorphic device is defective, based on comparing the difference value associated with the synaptic cell to a threshold value, builds an artificial neural network learning model to be transferred to the neuromorphic device in a state where a weight corresponding to a the defective synaptic cell is set to 0, and transfers a weight of the built artificial neural network learning model to the neuromorphic device.

5. The weight transfer apparatus of claim 4, wherein the weight transfer program inputs the same data to all the synaptic cells of the neuromorphic device, and then determines whether each synaptic cell among the synaptic cells is defective based on an output value of each synaptic cell.

6. The weight transfer apparatus of claim 4, wherein conductivity of the synaptic cell determined to be defective in the neuromorphic device is set to 0.

7. A weight transfer method for a neuromorphic device, the weight transfer method comprising:

building an artificial neural network learning model;

transferring a weight of the built learning model to the neuromorphic device;

determining, for each synaptic cell among synaptic cells included in the neuromorphic device to which the weight is transferred, a difference value between a conductivity value to be recorded in the synaptic cell and a conductivity value output from the synaptic cell;

determining a synaptic cell among the synaptic cells included in the neuromorphic device to which the weight is transferred is defective, based on comparing the difference value associated with the synaptic cell to a threshold value;

rebuilding the artificial neural network learning model by setting a weight of the artificial neural network learning model corresponding to a-the synaptic cell determined to be defective to 0; and transferring a weight of the rebuilt artificial neural network learning model to the neuromorphic device.

8. The weight transfer method of claim 7, further comprising:

setting conductivity of the synaptic cell determined to be defective in the neuromorphic device to 0.

9. A weight transfer method for a neuromorphic device, the weight transfer method comprising:

determining, for each synaptic cell among synaptic cells included in the neuromorphic device, a difference value between a conductivity value to be recorded in the synaptic cell and a conductivity value output from the synaptic cell;

determining a synaptic cell among the synaptic cells included in the neuromorphic device is defective, based on comparing the difference value associated with the synaptic cell to a threshold value;

building an artificial neural network learning model by setting a weight of the artificial neural network learning model corresponding to a synaptic cell determined to be defective to 0; and transferring a weight of the built artificial neural network learning model to the neuromorphic device.

10. The weight transfer method of claim 9, wherein, the determining on whether the synaptic cell is defective comprises:

inputting the same data to all the synaptic cells of the neuromorphic device, and determining whether each synaptic cell among the synaptic cells is defective based on an output value of each synaptic cell.

11. The weight transfer method of claim 9, further comprising:

setting conductivity of the synaptic cell determined to be defective in the neuromorphic device to 0.

* * * * *